May 12, 1953     R. E. REEVE     2,637,962
SURCINGLE HANDLING APPARATUS
Filed Sept. 25, 1951
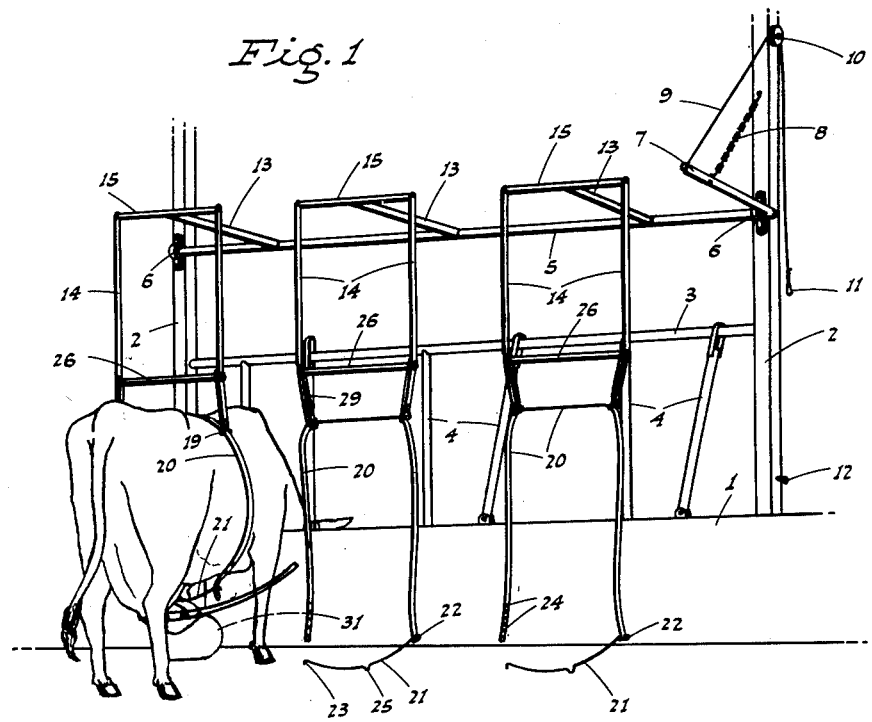
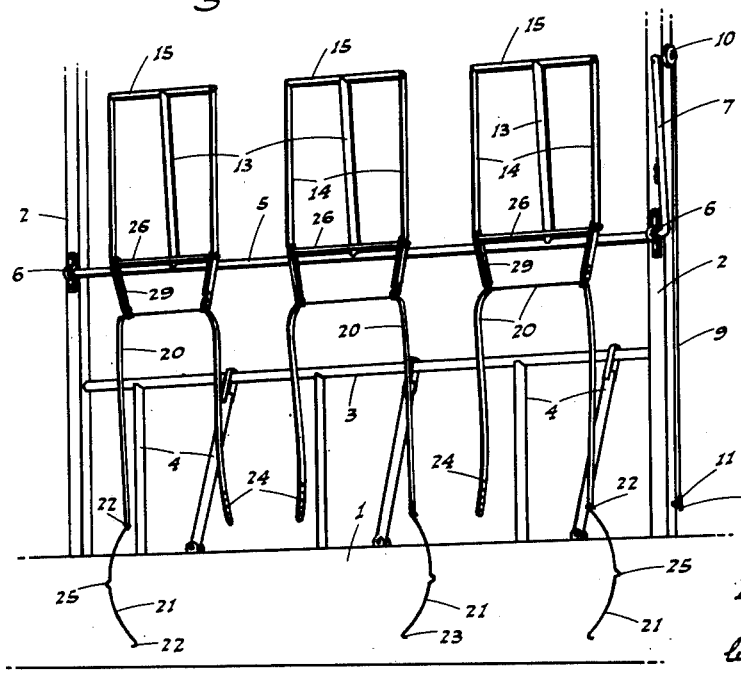
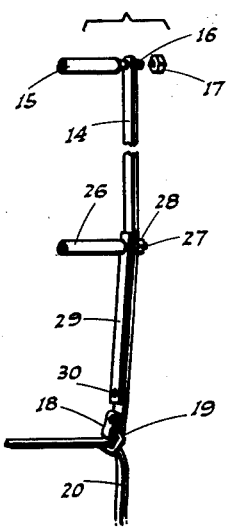
INVENTOR
Robert E. Reeve
ATTORNEYS Patented May 12, 1953

2,637,962

UNITED STATES PATENT OFFICE 2,637,962

SURCINGLE HANDLING APPARATUS

Robert E. Reeve, Tracy, Calif.

Application September 25, 1951, Serial No. 248,128

3 Claims. (Cl. 54—84)

This invention relates in general to dairy equipment, and particularly to that employed in the milking operation.

In the milking of cows by machines, it is customary for the milk receiving unit to be suspended beneath the cow's belly by a surcingle, which spans across the cow's back; such surcingle having heretofore been applied by hand. When a large number of cows are being milked, considerable time has been required to place the surcingles on the cows before milking, and to remove the surcingles after milking.

It is therefore the principal object of this invention to provide apparatus, in association with the stanchions, which effectively suspends corresponding surcingles for lowering to a position of use on the cows' backs before milking, and lifts the surcingles to an out-of-the-way position after milking.

An additional object of the invention is to provide apparatus, in association with the stanchions, which is arranged so that all of the surcingles for the cows at a row of stanchions are simultaneously moved up or down between said positions, as in the preceding paragraph.

Another object of the invention is to provide surcingle handling apparatus in which the surcingles, when raised to said out-of-the-way position, are also advanced to suspend immediately adjacent the stanchions so that clearance of the surcingles from the cows as they leave the milking stations is assured.

A further object of the invention is to provide surcingle handling apparatus which functions smoothly, easily, and without disturbing the cows in position at the stanchions.

It is also an object of the invention to provide surcingle handling apparatus which is designed for ease and economy of manufacture.

A still further object of the invention is to provide practical and reliable surcingle handling apparatus, and which is exceedingly effective for the purpose for which it is designed.

These objects are accomplished by means of such structure and relative arrangement of parts as will fully appear by a perusal of the following specification and claims.

In the drawings:

Fig. 1 is a perspective view of the apparatus with the surcingles lowered; one being in use.

Fig. 2 is a perspective view of the apparatus with the surcingles raised.

Fig. 3 is a fragmentary enlarged perspective view of one of the suspension straps, showing the manner of its connection in the apparatus and with a surcingle.

Referring now more particularly to the characters of reference on the drawings, the novel surcingle handling apparatus is adapted to be mounted in connection with the stanchion assembly in a dairy barn, such assembly embodying a stanchion wall 1 which upstands ahead of the milking stations, and such wall provides the support for a frame made up of spaced posts 2 connected a distance above the stanchion wall 1 by a top bar 3. The stanchions 4 extend between the top of the stanchion wall 1 and the top bar 3, being of conventional type, and one being provided for each milking station. The invention is here disclosed in connection with a stanchion assembly which embraces three of such milking stations.

Above the bar 3 there is a horizontal shaft 5 which extends between, and is journaled, as at 6, in connection with the posts 2; such shaft 5 being formed at one end with a radial lever arm 7 adapted to swing between a forwardly projecting position, and a generally upstanding position, as shown in Figs. 1 and 2, respectively.

Lowering of the radial lever arm 7 below a predetermined horizontal plane is prevented by means of a limit chain 8, which connects diagonally between said lever arm 7 and an elevated point on the corresponding post 2.

A pull cord 9 connects to the outer end of the radial lever arm, then extends upwardly and inwardly over a pulley 10 on the adjacent post 2, and thence depends a substantial distance, terminating at its lower end in a loop 11 adapted to be releasably engaged on a hook 12. The hook 12 is positioned for engagement by the loop 11 when the cord 9 is pulled downward a distance to swing the radial lever arm 7 to its upstanding position, as in Fig. 2.

In alinement with each milking station the horizontal shaft 5 is fixed with a T-arm 13, which T-arms are in substantial alinement with the radial lever arm 7 whereby to likewise swing from a forwardly projecting position, as in Fig. 1, to a generally upstanding position, as in Fig. 2, upon part-rotation of shaft 5 by lever arm 7 under the influence of the cord 9 when the latter is pulled.

A pair of heavy-duty suspension straps 14 are connected at their upper ends to opposite ends of the cross rod 15 of each T-arm 13; the manner of connection being an axial stud 16 projecting from each end of the cross rod 15 through a grommet in the strap, with the strap retained on the stud by a nut 17.

At their lower ends the suspension straps 14 are connected, as at 18, to metallic loops 19; there thus being a pair of such loops in transversely spaced relation suspended from each T-arm 13.

A surcingle 20 extends, intermediate its ends, through each such pair of loops 19 whereby the surcingle is supported in inverted, generally U-shape.

As usual, each surcingle 20 includes a connector link 21 engaged by a hook 22 with one lower end portion of the surcingle, and adapted to be releasably and vertically connected by a hook 23 and eyes 24 with the other lower end portion of said surcingle. Each connector link 21 includes a central V 25.

Intermediate the upper and lower ends thereof each pair of suspension straps 14 is maintained in properly spaced relation by a spanner rod 26 having a stud 27 at each end passing through the adjacent strap, with a nut 28 on the outer end of such stud. Also, to stabilize the suspension straps 14 below the spanner rod 26 said straps are faced with a reinforcing link 29, turnable at the upper end on the corresponding stud 27, and riveted at the lower end, as at 30, to the strap.

In operation of the above described surcingle handling apparatus, the same is initially in the position shown in Fig. 2, with the T arms 13 swung upwardly by the lever arm 7 and held in such position by engagement of the loop 11 with the hook 12. This disposes the surcingles 20 in a raised position immediately adjacent the related stanchions 4.

After the cows come to position in the milking stations, with the cow's head in the stanchions (one cow being shown in such position in Fig. 1), the cord 9 is released and the lever arm 7 and the T-arms 13 are permitted to swing forwardly and downwardly to their projecting positions. This carries the surcingles 20 likewise forwardly and downwardly, with such surcingles automatically moving to position, extending over the back of the adjacent cow, and depending on opposite sides thereof. It is then only necessary for the operator to complete connection of the links 21 with the lower end portions of the surcingles 20 beneath the bellies of the cows.

It will thus be recognized that the surcingles for a number of milking stations can be readily and simultaneously brought to place on the cows, all with a minimum of hand labor.

After the surcingles are in place and the links 21 connected, each such link serves, as usual, to suspend a milk receiving unit, one of which is indicated at 31, with the handle or bail of such unit engaged over the link and located by the central V 25.

After the milking operation is complete and the milk receiving units 31 removed, the connecter links 21 are released at one end and then all of the surcingles 20 are swung upwardly and forwardly clear of the cows by the simple expedient of pulling on the cord 9 and engaging the loop 11 with hook 12. With such a pull the lever arm 7 and T-arms 13 swing to their upstanding positions, as in Fig. 2, carrying the surcingles 20 to their raised out-of-the-way position immediately above the stanchions 4.

From the foregoing description it will be readily seen that there has been produced such an apparatus as will substantially fulfill the objects of the invention, as set forth herein.

While this specification sets forth in detail the present and preferred construction of the apparatus, still in practice such deviations from such detail may be resorted to as do not form a departure from the spirit of the invention, as defined by the appended claims.

Having thus described the invention the following is claimed as new and useful, and upon which Letters Patent are desired:

1. Apparatus for handling a surcingle comprising, adjacent and milking station, a support, a cross rod above such station, means mounting the cross rod in connection with the support for up-and-down motion above a cow at said station, suspension elements depending from the cross rod in transversely spaced relation, and loops on the lower ends of the suspension elements through which the surcingle slidably extends intermediate its ends whereby the surcingle is suspended in inverted U-shape.

2. Apparatus for handling a surcingle comprising, adjacent a milking station, upstanding supports, a transverse shaft journaled on the support in a substantially elevated plane, a T member fixed at the base on the shaft for projection therefrom over said station and including a cross rod parallel to the shaft, suspension elements swingably depending from opposite ends of said cross rod of the T member, means attaching the suspension elements at their lower ends to a surcingle at transversely spaced points intermediate its ends whereby the surcingle is suspended in inverted U-shape, means applied to the shaft to rotate the same so as to swing the T member from a lowered position projecting over said station to a raised generally upstanding position, and means between the shaft rotating means and the supports to releasably secure the shaft against rotation in a direction to permit the T member to lower from said upstanding position.

3. Apparatus for handling cow-engaging surcingles at a row of milking stations comprising upstanding supports adjacent the row, a horizontal shaft journaled on the supports and extending lengthwise of the row in a substantially elevated plane, radial arms one for each station secured on the shaft for projection therefrom over such station, a cross rod parallel to the shaft rigid with each arm at its outer end, straps attached to and swingably depending from opposite ends of each rod, means on the straps at their lower end for supporting engagement with a surcingle at transversely spaced points intermediate its ends whereby the end portions of the surcingle depend so as to straddle a cow, and control means applied to the shaft to rotate the same so as to simultaneously swing the arms from a lowered position overhanging the stations to a raised generally upstanding position.

ROBERT E. REEVE.

References Cited in the file of this patent

UNITED STATES PATENTS

| Number | Name | Date |
|---|---|---|
| 889,045 | Rodden et al. | May 26, 1908 |
| 934,569 | Quinlan et al. | Sept. 21, 1909 |
| 1,239,407 | Larsen | Sept. 4, 1917 |
| 2,023,774 | Sterling | Dec. 10, 1935 |
| 2,585,982 | Wood | Feb. 19, 1952 |
| 2,601,845 | Youngman | July 1, 1952 |